United States Patent [19]

Moens

[11] 3,900,667

[45] Aug. 19, 1975

[54] REINFORCING WIRE ELEMENT AND MATERIALS REINFORCED THEREWITH

[75] Inventor: Joris Moens, Kortrijk, Belgium

[73] Assignee: N.V. Bekaert S.A., Zwevegem, Belgium

[22] Filed: Sept. 8, 1972

[21] Appl. No.: 287,236

Related U.S. Application Data

[63] Continuation-in-part of Ser. No. 69,623, Sept. 4, 1970, abandoned.

[30] Foreign Application Priority Data

Sept. 12, 1969 Netherlands.......................... 6913898

[52] U.S. Cl. ............... 428/292; 29/193; 29/193.5; 52/659; 264/31; 106/97; 106/288 B; 260/42.22; 260/37 M; 260/762; 428/369

[51] Int. Cl. ............................ E04c 5/00; B32b 5/16

[58] Field of Search ........................ 161/168-170, 161/173, 181; 106/99; 52/659; 117/128.4; 29/193, 193.5; 264/31

[56] References Cited

UNITED STATES PATENTS

| 937,142 | 10/1909 | Chappelow...................... 264/253 |
|---|---|---|
| 1,594,402 | 8/1926 | Booze ................................ 52/659 |
| 1,633,219 | 6/1927 | Martin ............................... 52/659 |
| 1,913,707 | 6/1933 | Etheridge........................... 52/659 |
| 2,677,955 | 5/1954 | Constantinesco.................. 52/659 |
| 3,429,094 | 2/1969 | Romualdi.......................... 161/143 |
| 3,684,474 | 8/1972 | Chisholm......................... 52/659 X |
| 3,728,211 | 4/1973 | Ball et al........................... 161/181 |

FOREIGN PATENTS OR APPLICATIONS

| 252,975 | 6/1926 | United Kingdom................. 52/659 |
|---|---|---|
| 799,860 | 8/1958 | United Kingdom................. 52/659 |
| 587,169 | 4/1925 | France |
| 589,292 | 5/1925 | France |
| 138001 | 5/1940 | Japan |

Primary Examiner—George F. Lesmes
Assistant Examiner—Charles E. Lipsey
Attorney, Agent, or Firm—Shlesinger, Arkwright, Garvey & Dinsmore

[57] ABSTRACT

A wire element for being mixed in a subsequently hardening soft material. It consists of a substantially straight wire end, having at both extremities a bending in a form for which the hooking-in of two neighbouring elements is not possible.

4 Claims, 7 Drawing Figures

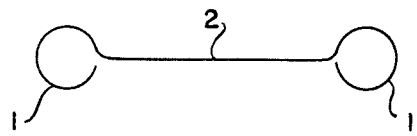
Fig. 1
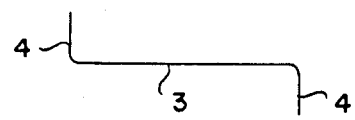
Fig. 2
Fig. 3
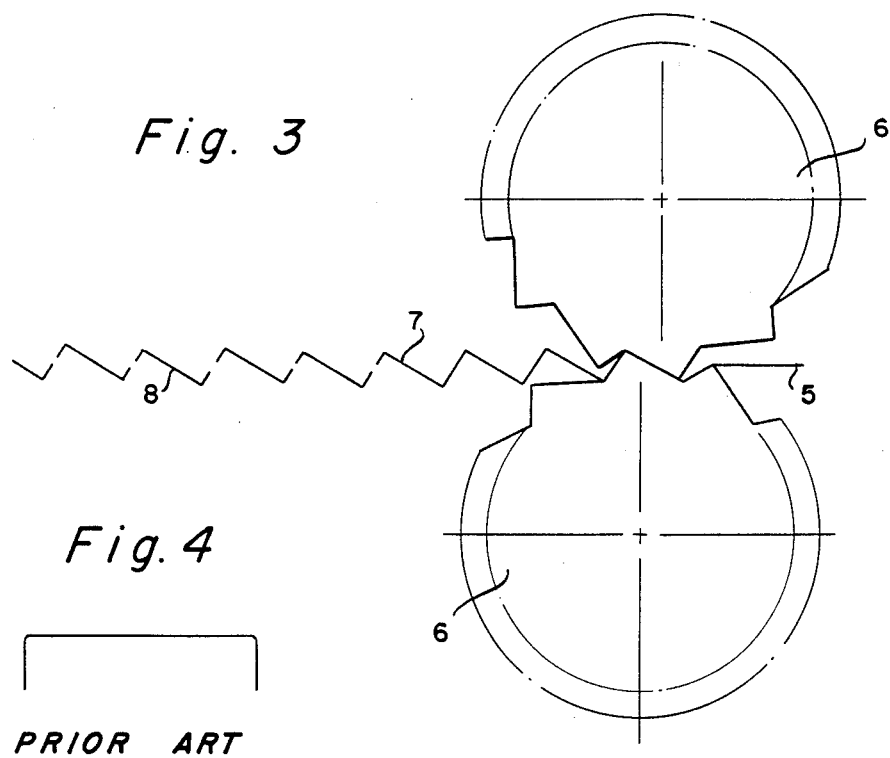
Fig. 4
PRIOR ART
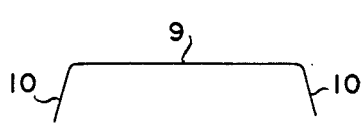
Fig. 5
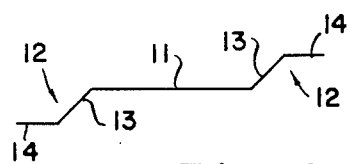
Fig. 6
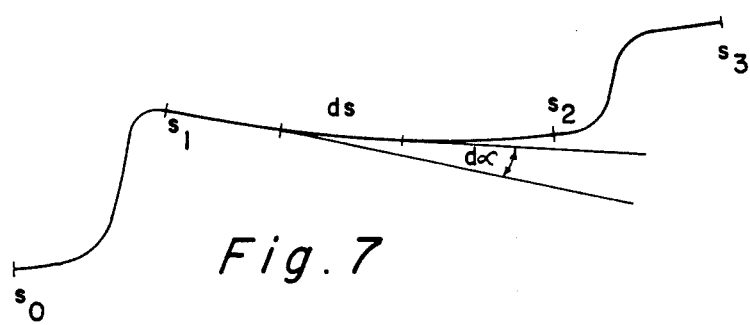
Fig. 7

REINFORCING WIRE ELEMENT AND MATERIALS REINFORCED THEREWITH

CROSS REFERENCE TO RELATED APPLICATIONS

This application is a continuation-in-part of my co-pending application Ser. No. 69,623 filed Sept. 4, 1970, now abandoned.

BACKGROUND OF THE INVENTION

The invention relates to a wire element for mixing in a subsequently hardening soft material. Such wire elements with a high modulus of elasticity and high tensile strength are used in great quantities for the reinforcement of synthetic resins, plastics, rubber and other materials, especially mortar and concrete, which only offer a small resistance to a tensile force. Those elements are short pieces of wire, made of steel, glass fiber or another similar material of high tensile strength which, when mixed up in a material with lower modulus of elasticity, results in a two phase material of remarkable strength.

In order to improve the strength characteristics for a given weight of wire material, it has been proposed to increase the concentration of wires in the mass by a greater subdivision of finer wires. A sufficient length to diameter ratio is necessary in order to assure a sufficient grip of the wire on the material. Several other wire forms have also been proposed in order to improve this grip, such as corrugations in the wire, helicoidal or ring shaped wires.

It has been observed, however, that the presence of wire elements in the material has a detrimental influence on the mixability. The elements have a tendency to knit together into balls, and the distribution of the wires is then insufficient. For straight wires it is known that this tendency increases with the concentration of wires in the mass and with the length to diameter ratio. And these are exactly the conditions for good strength characteristics. From this, it may reasonably be deducted that, for a given shape of wire, there is an incompatibility between the conditions of good strength and good mixability.

The invention is based on the understanding that there must exist wire forms for which this incompatibility is less severe than for straight wires.

It is therefor an object of the present invention to provide a type of wire elements for which this incompatibility is greatly attenuated, and for which it is possible to obtain for a given strength, a better mixability, with the same percentage of steel.

According to the invention, the wire element is characterized by the fact that it consists of a substantially straight wire end, having at both extremities a bending in a form for which the hooking-in of two neighbouring elements is not possible.

A better understanding of the reasons which are assumed to be the cause of these advantages will be given here with the help of an explanation of what is assumed to happen, on one hand, when the reinforced material resists to crack propagation under a loading stress, and, on the other hand, when the elements are mixed in the soft material which will harden afterwards.

Under a loading stress, the propagation of any incipient crack is arrested by the wire element which the crack edge finds on its way. There, the wire takes over the concentrated local tensile force provoking the propagation of the crack, and this force is transmitted through the wire and redistributed over the surrounding matrix material via the contact surface where reaction forces are built up which resist any relative motion of the wire within the material. This is called further the grip of the wire in the material. For example, a straight wire element in the way of a perpendicularly incident crack takes over a pure tensile force, and the reaction forces are the also parallel with the wire axis and delivered by the adherence of the wire to the material. In the regions of curvature of a non-straight wire under tension, there are in addition, reaction forces which are perpendicular to the contact surface, and these add to the grip. So the grip depends on the length and the form of the wire.

To obtain a good mixability, it is desired to use wire elements which have a small length to diameter ratio. But when a wire element of a certain diameter is too short, then it cannot provide a comparable grip with respect to the tensile force which the wire is able to support, and it is then unnecessary and uneconomical to use them such a great diameter. The steel is used uneconomically and for a given percentage of reinforcement the strength leaves much to be desired. Consequently, for straight wires, when using shorter and shorter wire elements, the mixability improves, but it is impossible to go under a certain limit of length to diameter ratio without losing too much strength.

It is now possible, by using incurved elements such like helicoids or corrugated wires, to improve the grip of the element in the material, so that a lower length to diameter ratio limit is obtained and, for a same strength, shorter wire elements can be used, which have a better mixability. But here the incurvations may in turn have a detrimental effect on the mixability, in such a way that the total result would be negative. And here arises a first problem: to find a type of incurvations which permit to give a maximum increase of the grip, and so permitting to use shorter wires with better mixability, but which give a minimum of deterioration of the mixability directly due to the incurvations themselves.

There is a second problem in connection with incurvated wires: their effective length is smaller than that of a straight wire of the same length. By this is meant that a straight wire covers a greater area where the propagation of the crack edge can be stopped. A propagating edge has more chances to find on its way a straight wire, than a corrugated wire of the same wire length, and this is detrimental to the final strength of the material. Consequently the problem is to find a type of incurvations which, while giving a maximum increase of the grip, give a minimum loss of the effective length.

It can indeed be observed that for the wire elements according to the invention, a good effective length is obtained: the wire element is a substantially straight element. This means that the substantially straight central portion of the wire is at least as long as the part which forms the bendings at both extremities. A mathematical straightness is not necessary for the substantially straight central portion, and even not possible in practice. For calling this portion a substantially straight portion, it is sufficient that the integral over this straight portion, of the absolute value of the incurvation per unit of length, or curvature is lesser than 45°.

While maintaining a maximum effective length, a good grappling of the elements in the material is obtained by the bendings on both extremities. By such an extremity having a bending is meant that the part of the wire on each side of the substantially straight portion has a length of at least five diameters and that the integral over this length of the absolute value of the incurvation per unit of length is at least 60°. A wire extremity which does not satisfy those conditions can hardly be considered as a grappling extremity.

Finally it has been observed that the mechanism of balling up during the mixing operation depends on the type of wire element. Long straight wires are flexible and able to interwine. Short wire ends have more the tendency to enter with one extremity and to remain pinned in the forming ball and subsequently to pleat during further mixing and become a part of the ball. For substantially straight short wire elements with bendings on both ends this mechanism of pinning in does not seem to be possible, and nevertheless also a balling up phenomenon exists. It has been observed by the inventor that this happened especially with bendings in the form of a hook, and further observation showed that the balling up is due to the wire extremities which hook together. From this it may be concluded that the bending at the extremities of a straight wire, in a form where the hooking-in of two neighbouring elements is not possible, not only prevent the hooking-in mechanism, but also the pinning-in mechanism. Consequently a type of incurvation of a wire element has been found, which not only permits to give an increase in the grip, permitting to use shorter wires with better mixability, but which also procures a further improvement of this mixability. But it has also been explained that this type of incurvation was a type which, while giving a good grappling in the material, gives a minimum loss of effective length. And so the two problems relating to a good type of incurvation of a wire element have been solved. And it is believed that this is the explanation of the compatibility between strength of the material and mixability for the wire elements according to the invention. So it results that the length to diameter ratio, for which the best results are obtained is between 50 to 1 and 200 to 1.

SUMMARY

Wire element for being mixed or commingled in a subsequently hardening soft material consisting of a substantially straight wire end, having at both extremities a bending in a form for which the hooking-in of two neighbouring elements is not possible.

Both wire extremities are formed by a straight wire part, which are bent over in such a way that for at least one of the extremities the normal in each point of the surface does not pass through the other extremity.

In a further embodiment both wire extremities are formed by at least two straight parts which are separated from the adjacent straight part by a bending of at least 45° over a radius of curvature lesser than the wire diameter, and in such a way that for at least one of the extremities the normal in each point of the surface does not pass through the other extremity.

The invention further comprises two-phase material consisting of a hardened substance having wire elements which are uniformly distributed and randomly oriented therein, the wire elements being substantially straight wire ends formed in manners herein above described.

In an embodiment the average distance between the centroids of each element is substantially less than a fourth part of the wire length of each element.

Various objects, features and advantages will clearly appear from the detailed description given below taken in connection with the accompanying drawings which form part of this specification and illustrate merely by way of examples embodiments of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawings in which:

FIG. 1 is a first example of a wire element according to the invention with completely incurved wire extremities;

FIG. 2 is a second example of a wire element according to the invention with straight wire extremities;

FIG. 3 shows a method by which the wire element according to FIG. 2 can be obtained;

FIG. 4 is an example of a wire element which does not answer to the criterion of the invention;

FIG. 5 is a modification of the example according to FIG. 4, but which conforms to the criterion of the invention;

FIG. 6 is a preferred example of a wire element according to the invention; and

FIG. 7 is a schematic illustration on an enlarged scale of a wire element similar to that of FIG. 6.

In the example according to FIG. 1, each extremity 1 of the wire element 2 is bent over to form a closed circle. This form does not permit that neighbouring wire elements hook in each other. An element according to FIG. 1 is however difficult to manufacture. It is more easy to make a wire element 3 with straight wire extremities 4, as shown in FIG. 2. A straight wire 5 can be deformed between a pair of special shaped gears 6 to a triangular wave form 7 (FIG. 3) and subsequently cut into short wire ends 8. For elements 8 the extremities cannot hook in each other when the angles of bending are not acute. In the example of FIG. 4 however, where both wire extremities are also formed by a straight wire part, the angles of bending must be obtuse (FIG. 5). Here, the substantially straight central part 9 connects the extremities 10. Likewise in FIG. 6, the substantially straight central part 11 connects the extremities 12 formed of two substantially straight portions 13 and 14. It can be taken as a criterion for these elements with straight wire extremities, that in at least one of those extremities the normal in each point of the surface does not pass to the other extremity. In that case the elements cannot be suspended to each other by the extremities, because there is no position of equilibrium.

Preferably the wire element is made of steel wire which is bent over according to FIG. 2. In that case a bending of 90° is possible and a better grappling of the wire extremity is obtained. For said elements with straight wire extremities some tests have been made to examine the influence of the grappling effect of the length of the extremities, the angle of bending and the radius of curvature. For each test, five elements have been embedded with one half in an unsaturated polyester resin which subsequently hardened at room temperature. The wires were 0.35 mm surface cleaned steel and the straight central part was embedded at right angles in the polyester surface over a length of 15 mm. The force to pull out the elements was measured, and an average value for the five elements was calculated. The results are tabulated hereinafter, wherein $\beta$ is the angle over which the straight wire extremity has been bent over with respect to the straight central part, L/d is the ratio of the length of the straight wire extremity to the diameter, and R/d is the ratio of the radius of curvature of the bending to the diameter of the wire. The values for the pulling force are given in kg.

TABLE I

Influence of $\beta$ and L/d with constant radius of curvature = 0.5 d

| L/d | $\beta$ 0° | 45° | 60° | 80° |
|---|---|---|---|---|
| 4.3 | 4.1 | 7.9 | 10.4 | 11.4 |
| 10 | 4 | 7.5 | 10.2 | 11.9 |
| 14.3 | 4.1 | 7.8 | 10.7 | 12.9 |

TABLE II

Influence of L/d and R/d with constant angle of bending $\beta = 60°$

| L/d | R/d 0.5 | 1 | 2 |
|---|---|---|---|
| 4.3 | 10.4 | 8.2 | 7.3 |
| 10 | 10.2 | 8 | 7.3 |
| 14.3 | 10.7 | 8.6 | 7.7 |

From these results it can be concluded that the sharpness of the angle is of great importance, and that the length L of the straight wire extremity has only a small influence on the breaking strength of the material. But it has been observed that the total energy to pull out the element is approximately proportional with this length. This is confirmed by Table III in which the energy is given in Kgmm.

TABLE III

Energy in function of $\beta$ and L/d with constant radius of curvature = 0.5 d

| L/d | $\beta$ 45° | 60° | 80° |
|---|---|---|---|
| 4.3 | 9.5 | 12.5 | 13.7 |
| 10 | 24.4 | 29.6 | 36.8 |
| 14.3 | 32.6 | 44.9 | 53.0 |

This can be explained by the fact that the wire element is pulled out through the "tunnel" in which it was embedded. Each part of the straight extremity must pass through the curvature in this tunnel and is there subsequently bent and straightened again when it passes in the straight part of the tunnel. The whole length L of the straight extremity part undergoes this, and this needs a constant pulling force during all the time that the extremity has not passed completely the curvature of the tunnel. By this can be explained that the total energy to pull out is proportional to L.

So it can be understood that two phase materials with elements which need a great pulling out energy need a great breaking energy. The first crack may occur at the same charge, but then still a force is needed to continue the deformation up to a complete breaking. This is important for materials which need a great impact resistance, such like concrete for bunkers, or for materials for which a kind of plastic flow is desired before breaking. In any case, the rate of plastic flow can be controlled by the length L, and the pulling force by the angle and the radius of curvature R. So the curve of the force in function of elongation can be controlled.

It is also possible to use wire extremities with more than one sharp bending. Those extremities may consist of at least two straight parts which are separated from the adjacent straight part by a bending of at least 45°. This combination of two bendings over an angle $\beta$ and two lengths L gives an additional possibility to control the shape of the force to elongation charateristic. But the condition still exists that the elements must not hook together, this means that for at least one of the extremities the normal in each point of the surface does not pass through the other extremity.

Referring now to FIG. 7, a mathematical expression of the bending within the wire segments can be set forth. The wire lengths $s_0 - s_1$ and $s_2 - s_3$ are the extremities having a substantial bending. These extremities should have a length at least five times the diameter, and the total absolute bending must be at least 60°. The "total absolute bending" of a given length is the intregral over this length of the absolute value of the incurvation per unit length. Where $d\alpha$ is the incremental angle of bending of an incremental length ds of the wire, then the rate of incurvation at a point P of the wire is equal to $d\alpha/ds$. The total absolute bending of the extremities is then expressed as $$\int_{s_0}^{s_1} \left|\frac{d\alpha}{ds}\right| ds \geq 60° \text{ and } \int_{s_2}^{s_3} \left|\frac{d\alpha}{ds}\right| ds \geq 60°$$

With respect to the substantially straight central part as defined by points $s_1 - s_2$ in FIG. 7, the total absolute bending must be less than 45° and may be expressed mathematically as $$\int_{s_1}^{s_2} \left|\frac{d\alpha}{ds}\right| ds < 45°$$

These expressions described the wire reinforcing elements according to this invention so that the elements when used for reinforcing subsequently hardening soft material will be "unhookable" and have good mixability with the soft material and yet provide an extremely good grip in the material as well as very good reinforcement of the material.

It has been shown that with the wire elements according to the invention a good mixability is obtained. For a length to diameter ratio in the range between 50 and 200, the elements can be mixed to a concentration where the average distance between the centroids of the neighboring elements is less than a fourth part of the length 1 of each element. By average distance is meant $$D = 3\sqrt{V/N}$$

V representing the total volume of the material and N the number of wire elements. And for a length to diameter ratio of 100, the statement the D<1/4 corresponds with a volume percentage of minimum 0.5% wire.

The invention is not limited to the materials which have been mentioned, nor to the forms of wire which have been shown, so it is possible to obtain wire elements of the same form with pieces of cable made with glass fibers and covered with a layer of a hard synthetic resin. With the explanation of the principle of the invention, it is possible for those skilled in the art to find a suitable matrix and wire material, and also a suitable form and concentration of the wire elements for each type of application.

While the invention has been described and illustrated with respect to certain preferred examples which give satisfactory results, it will be understood by those skilled in the art after understanding the principle of the invention, that various changes and modifications may be made without departing from the spirit of the invention.

I claim:

1. A two-phase material having increased tensile strength and resistance to crack propagation comprising:
   a. a hardened matrix material,
   b. a plurality of wire elements substantially uniformly distributed and randomly oriented in said matrix material so that the average distance between the centroids of each element is less than one-fourth of the wire length of each element,
   c. said wire elements having a length to diameter ratio of between about 50 to 1 and 200 to 1,
   d. said wire elements each comprising a substantially straight central portion having a curvature of less than about 45° and having a length of at least one-half of the total length of said element and a pair of terminal portions connected by said central portion,
   e. said terminal portions comprising a substantially straight terminal part having a length of at least five times the diameter of said elements and further comprising a bending connecting said substantially straight terminal part to said substantially straight central portion,
   f. said bending being around a radius curvature less than the diameter of said wire segment and forming an angle of between 90° and 135° between said terminal part and said central portion,
   g. each of said terminal portions being so constructed and arranged that a normal to one of said terminal portions at every point therealong passes outside the other of said terminal portions,
   h. said elements being thusly so constructed and arranged as to inhibit hooking-in of each of said elements with respect to the other of said elements.

2. A two-phase material having increased tensile strength and resistance to crack propagation comprising:
   a. a hardened matrix material,
   b. a plurality of wire elements substantially uniformly distributed and randomly oriented in said matrix material so that the average distance between the centroids of the elements is less than one-fourth of the wire length of each element,
   c. said wire elements having a length to diameter ratio of between about 50 to 1 and 200 to 1,
   d. said wire elements each comprising a substantially straight central portion having a curvature of less than about 45° and having a length of at least one-half of the total length of said element and a pair of terminal portions connected by said central portion,
   e. said wire segment terminal portions each having a substantial curvature and a length of at least five times the diameter of said wire segment and said terminal portions being connected by said central portion,
   f. said substantial curvature comprising a total absolute bending of at least 60°,
   g. each of said terminal portions being so constructed and arranged
      1. that a normal to one of said terminal portions at every point therealong passes outside the other of said terminal portions, or
      2. that each of said terminal portions forms a closed loop
   so as to inhibit hooking-in of each of said elements with respect to the other of said elements.

3. The material as defined in claim 2 and wherein each of said terminal portions includes two substantially straight portions separated by a bending of at least 45°.

4. The material as defined in claim 2 and wherein each of said terminal portions includes at least two substantially straight portions, each of said substantially straight portions being separated from any adjacent substantially straight portion by a bending of at least 45°.

* * * * *